(12) United States Patent
Tsukamoto

(10) Patent No.: US 11,794,855 B2
(45) Date of Patent: Oct. 24, 2023

(54) ELECTRIC POWER ASSIST DEVICE AND BICYCLE

(71) Applicant: HONDA MOTOR CO., LTD., Tokyo (JP)

(72) Inventor: Kenji Tsukamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 17/436,763

(22) PCT Filed: Mar. 6, 2020

(86) PCT No.: PCT/JP2020/009825
§ 371 (c)(1),
(2) Date: Sep. 7, 2021

(87) PCT Pub. No.: WO2020/184472
PCT Pub. Date: Sep. 17, 2020

(65) Prior Publication Data
US 2022/0177072 A1  Jun. 9, 2022

(30) Foreign Application Priority Data
Mar. 13, 2019 (JP) ................................ 2019-045501

(51) Int. Cl.
*B62M 6/55* (2010.01)

(52) U.S. Cl.
CPC ..................................... *B62M 6/55* (2013.01)

(58) Field of Classification Search
CPC . B62M 6/55; B62M 6/20; B62M 6/40; B62K 2204/00; B62K 2202/00
(Continued)

(56) References Cited

U.S. PATENT DOCUMENTS

| 5,067,370 | A | 11/1991 | Lemmens |
| 11,498,642 | B2 * | 11/2022 | Tsukamoto ............. B62M 3/00 |

(Continued)

FOREIGN PATENT DOCUMENTS

| CN | 202807032 U | 3/2013 |
| DE | 102017201617 A1 | 8/2018 |

(Continued)

OTHER PUBLICATIONS

Extended European Search Report for Patent Application PCT/JP2020009825 dated Apr. 29, 2022; 9 pp.

(Continued)

*Primary Examiner* — Anne Marie M Boehler
(74) *Attorney, Agent, or Firm* — Armstrong Teasdale LLP

(57) ABSTRACT

The center axis of a rotational output member of an electric power assist device and the center axis of a crankshaft can be adjusted to be in parallel to each other without complicating the structure. The electric power assist device comprises a housing 52, an electric motor 58 supported by the housing, and an annular rotational output member 64 configured to be connected to a crankshaft 24 or a crankarm 26 attached to the crankshaft so as to be rotatively driven by the electric motor coaxially with respect to the crankshaft, wherein the housing is supported on the frame structure 18 via a support part 90 provided with an adjustment mechanism 120 to allow a position of the housing along an axial direction of the crankshaft to be varied.

9 Claims, 14 Drawing Sheets

(58) Field of Classification Search
USPC .............................. 180/206.1, 206.4, 205.4
See application file for complete search history.

(56) References Cited

U.S. PATENT DOCUMENTS

| | | | |
|---|---|---|---|
| 2005/0039963 A1* | 2/2005 | Forderhase | B62M 1/36 180/206.4 |
| 2013/0032425 A1* | 2/2013 | Lee | B62K 19/34 180/220 |
| 2017/0016526 A1* | 1/2017 | Watarai | F16H 57/025 |
| 2017/0313381 A1 | 11/2017 | Mano | |
| 2019/0039677 A1 | 2/2019 | Noda et al. | |

FOREIGN PATENT DOCUMENTS

| | | |
|---|---|---|
| JP | H10167159 A | 6/1998 |
| JP | 2002264881 A | 9/2002 |
| JP | 2007091159 A | 4/2007 |
| JP | 2009248668 A | 10/2009 |
| JP | 2019031263 A | 2/2019 |
| KR | 20130110294 A | 10/2013 |

OTHER PUBLICATIONS

English translation of International Search Report for Patent Application PCT/JP2020/009825 dated Apr. 21, 2020; 2 pp.

* cited by examiner

ELECTRIC POWER ASSIST DEVICE AND BICYCLE

CROSS-REFERENCE TO RELATED APPLICATIONS

This application is a U.S. National Phase Application of PCT/JP2020/009825 filed Mar. 6, 2020, which claims the benefit of Japanese Patent Application No. 2019-045501 filed Mar. 13, 2019. The contents of these applications are hereby expressly incorporated by reference in their entirety.

TECHNICAL FIELD

The present invention relates to an electric power assist device and a bicycle, and more particularly to an electric power assist device that can be retrofitted and a bicycle.

BACKGROUND ART

In a known electric power assist device for bicycles that can be retrofitted to existing bicycles, an assist gear that is rotationally driven by an electric motor configured to generate assist force is coaxially attached to a side of a sprocket which is in turn attached to the central shaft of a crankarm for a pedal. The assist gear is connected to the sprocket via a torque transmitting member to provide an assist force to the sprocket (see Patent Document 1, for example). In another known electric power assist device, a main gear that is rotationally driven by an electric motor configured to generate assist force is coaxially connected to the central shaft of a crankarm for a pedal, and the main gear and the crankarm are connected to each other via a torque transmitting member so that an assist force is provided to the crankarm. (See Patent Document 2, for example). In yet another known electric power assist device, a sprocket that is rotationally driven by an electric motor configured to generate an assist force is coaxially attached to a crankarm for a pedal (See Patent Document 3, for example).

PRIOR ART

Patent Document(s)

Patent Document 1: JP2007-91159A
Patent Document 2: JP2009-248668A
Patent Document 3: JP2002-264881A

SUMMARY OF THE INVENTION

Task to be Accomplished by the Invention

In an electric power assisted bicycle, it is desired that the center axis of the rotational output member of an electric power assist device and the center axis of the crankshaft are mutually parallel to each other, and not in a twisted relationship so that the rotational output of the electric power assist device is transmitted to the crankshaft without containing a whirling component.

A primary object of the present invention is to allow the center axis of the rotational output member of a power assist device and the center axis of the crankshaft to be adjusted to be in parallel to each other without complicating the structure.

Means to Accomplish the Task

The electric power assist device according to an embodiment of the present invention consists of an electric power assist device (50) configured to be attached to a frame structure (18) of a bicycle, comprising a housing (52), an electric motor (58) supported by the housing, and an annular rotational output member (64) configured to be connected to a crankshaft (24) of the bicycle or a crankarm (26) attached to the crankshaft so as to be rotatively driven by the electric motor coaxially with respect to the crankshaft, wherein the housing is supported on the frame structure via a support part (90) provided with an adjustment mechanism (120) to allow a position of the housing along an axial direction of the crankshaft to be varied.

Thus, the adjustment mechanism allows the central axis of the rotational output member to be parallel to the central axis of the crankshaft without complicating the structure.

In this electric power assist device, preferably, the adjustment mechanism includes a screw mechanism (108, 109) extending in the axial direction of the crankshaft between the housing and the frame structure.

Thereby, the structure of the adjustment mechanism can be simplified.

In this electric power assist device, preferably, the support part includes a mount member (92) fixed to the frame structure and provided with a through hole (103) extending in the axial direction, a screw hole (68) formed in the housing, and a fastening bolt passed through the through hole and threaded into the screw hole, and the screw mechanism is configured to adjust a distance between the mount member and the housing along the axial direction.

Thereby, the structure of the adjustment mechanism can be simplified, and the axial distance between the mount member and the housing can be adjusted in a reliable manner.

In this electric power assist device, preferably, the fastening bolt and the screw mechanism are provided coaxially with each other.

Thereby, a compact design becomes possible and the adjustment accuracy of the adjustment machine can be improved.

Preferably, this electric power assist device further comprises a connecting structure configured to connect the rotational output member to the crankarm of the bicycle in a torque transmitting relationship, and the connecting structure comprises a connecting main member (72) having an opposing surface (74A, 77A) configured to oppose a front/rear surface (26C, 26D) of the crankarm of the bicycle with respect to a rotational direction thereof and fixed to the rotational output member, a wedge member (74, 77) configured to be interposed between the front/rear surface of the crankarm and the opposing surface of the connecting main member, and a screw member (80) configured to move the wedge member toward and away from the connecting main member.

Thereby, any rattling between the interposing part of the wedge member and the crankarm can be eliminated, and the work efficiency in assembling the electric power assist device to the bicycle can be improved.

In this electric power assist device, preferably, the wedge member is provided with a pair of sliding contact surfaces (74A, 74B, 77A, 77B) slidably contacting the front/rear surface and the opposing surface, respectively, and a slot (81) that is passed through the wedge member substantially parallel to a lengthwise direction of the crankarm from a radially outer side thereof with respect to the crankshaft to the sliding contact surface corresponding to the opposing surface so as to define an opening at the sliding contact surface, and to receive the screw member therein, the slot being elongated in a direction parallel to a plane orthogonal to the lengthwise direction of the crankarm and extending toward and away from the front/rear surface, the connecting main member being provided with a screw hole (83) opening at the opposing surface and threadably receiving the screw member therein.

Thereby, rattling between the wedge member and the crankarm can be eliminated in a reliable manner simply by tightening the screw member regardless of the shape and dimensions of the crankarm.

In this electric power assist device, preferably, the opposing surface of the connecting main member extends along a radial direction of the connecting main member at an oblique angle to a lengthwise direction of the crankarm, and the wedge member is substantially triangular in shape when viewed in the axial direction of the crankshaft.

Thereby, a reliable wedge action can be obtained so that rattling between the wedge member and the crankarm can be eliminated in reliable manner regardless of the shape and dimensions of the crankarm.

In this electric power assist device, preferably, the opposing surface of the connecting main member and the wedge member are provided on each side of the crankarm with respect to a rotational direction thereof, and the connecting structure is configured such that the wedge members interpose the crankarm therebetween from a front side and a rear side of the crankarm with respect to a rotational direction thereof.

Thereby, rattling between the wedge members and the crankarm can be eliminated on both sides the crankarm with respect to the rotational direction thereof so that rattling between the wedge members and the crankarm can be eliminated in reliable manner regardless of the shape and dimensions of the crankarm.

Preferably, this electric power assist device further comprises an elastic member (84) interposed between each front/rear surface of the crankarm and the sliding contact surface of the corresponding wedge member opposing this front/rear surface.

Thereby, even if the parallelism between the front/rear surfaces of the crankarm and the sliding contact surfaces of the wedge members is poor or there are differences in shape between them, the torque transmission between the wedge members and the crankarm can be performed in a reliable manner without involving rattling, A bicycle according to an embodiment of the present invention is fitted with this electric power assist device.

Effect of the Invention

According to the electric power assist device of the present invention, the center axis of the rotational output member of the power assist device and the center axis of the crankshaft can be adjusted to be in parallel to each other without complicating the structure.

DESCRIPTION OF PREFERRED EMBODIMENT(S)

An electric power assisted bicycle according to an embodiment of the present invention is described in the following with reference to FIGS. 1 to 7.

Figure 1:
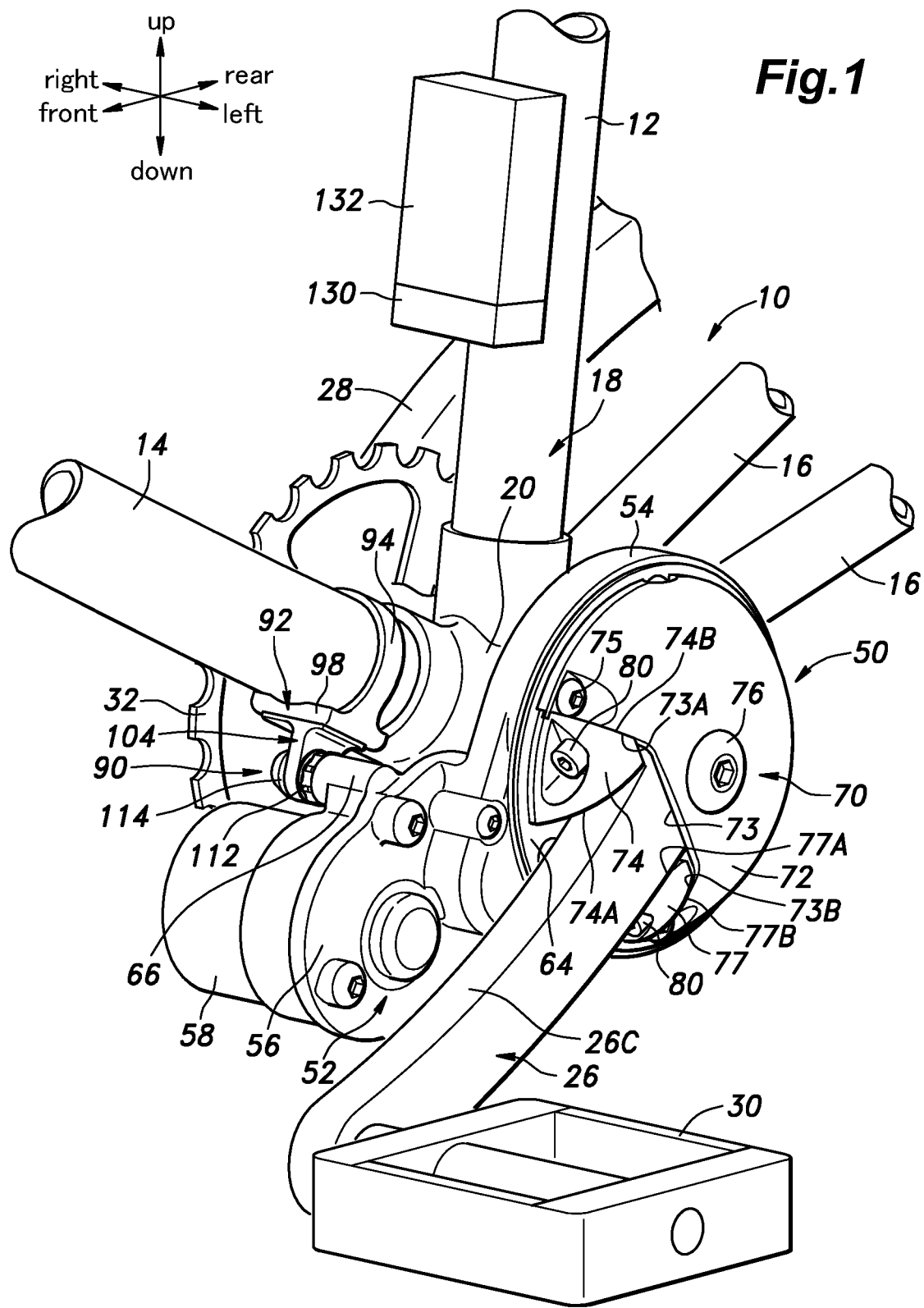
FIG. 1 is a fragmentary perspective view of an electric power assist device according to an embodiment of the present invention and a bicycle fitted with this electric power assist device.
Figure 2:
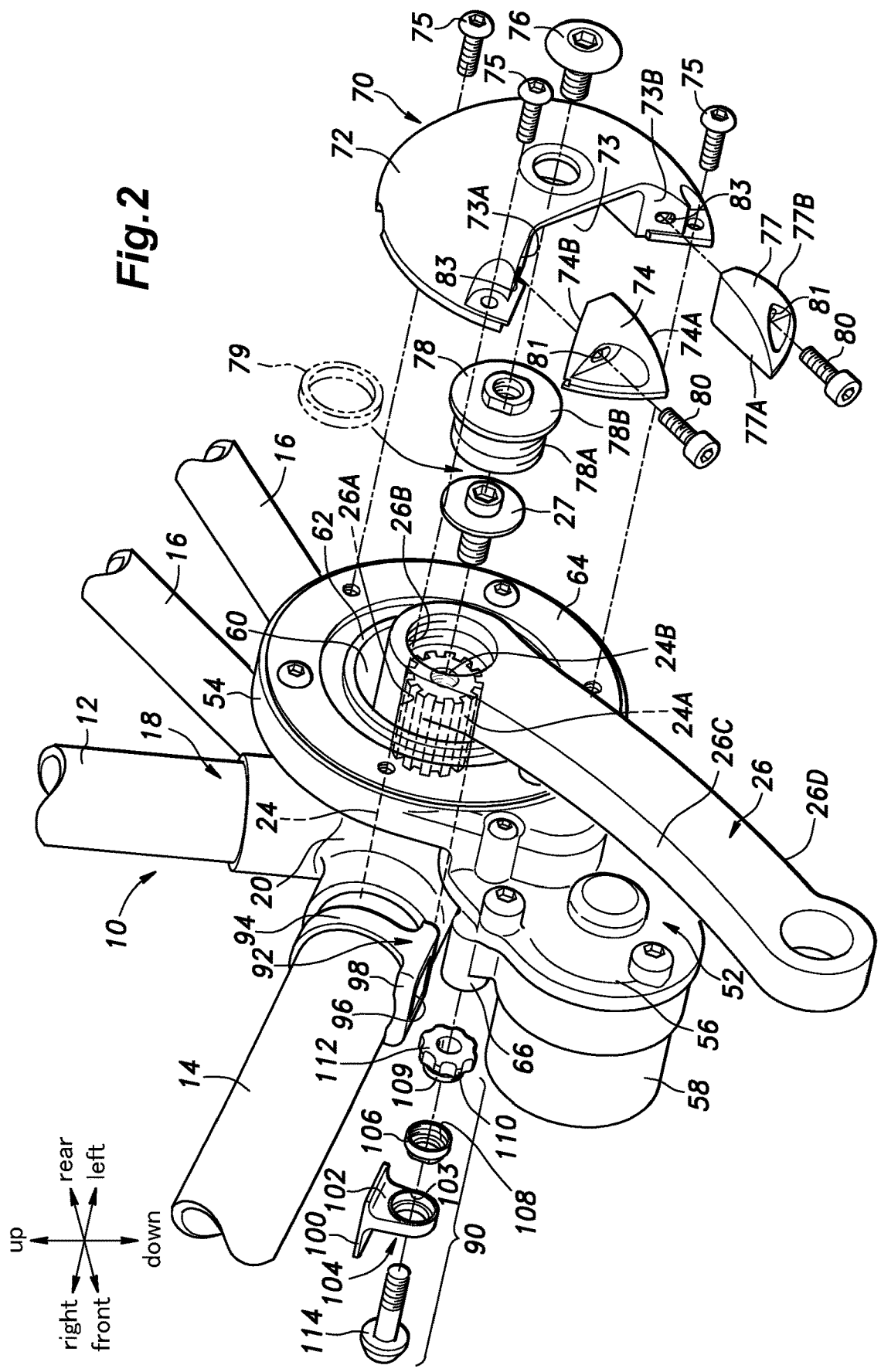
FIG. 2 is a fragmentary exploded perspective view of the bicycle.
Figure 3:
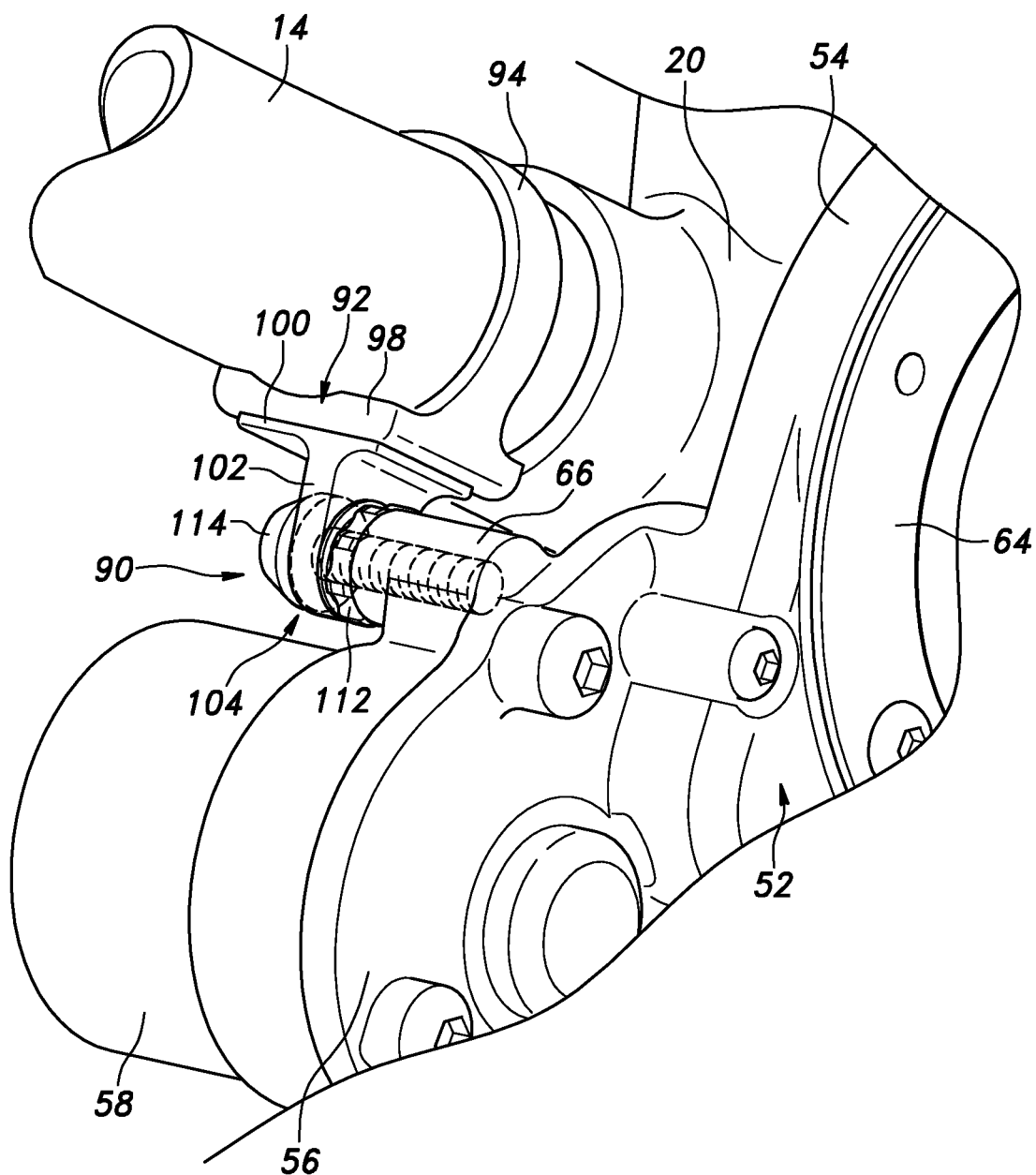
FIG. 3 is a fragmentary enlarged perspective view of the bicycle.

As shown in FIGS. 1 and 2, the electric power assisted bicycle 10 is provided with a frame structure 18 that includes a seat tube 12 extending substantially in the vertical direction and having a saddle (not shown in the drawings) attached to the upper end thereof, a down tube 14 extending substantially in the fore and aft direction, and a left and right chain stay 16. The lower end of the seat tube 12, the rear end of the down tube 14, and the front ends of the chain stays 16 are connected to one another other by a bearing tube 20 configured to support a crankshaft and also serving as a pipe joint.

The bearing tube 20 rotatably supports a crankshaft 24 (see FIG. 2) extending substantially horizontally in the lateral direction. The left and right shaft ends of the crankshaft 24 project out of the bearing tube 20, and the base ends of the left and right crankarms 26 and 28 are fixed to the respective shaft ends of the crankshaft 24 with a rotational phase difference of 180 degrees. The crankshaft 24 forms the rotational center of the crankarms 26 and 28, and the rotational center axis of the crankshaft 24 and the rotational center axis of the crankarms 26 and 28 coincide with each other.

A spline shaft portion 24A is formed on the outer circumferential surface of the shaft end of the crankshaft 24. A spline hole 26A is formed at the base end of the crankarm 26. The spline shaft portion 24A and the spline hole 26A are engaged with each other so that the crankshaft 24 and the crankarm 26 are connected to each other in a torque transmitting relationship.

The outer end of the crankshaft 24 is formed with a screw hole 24B opened at the end surface thereof. The base end of the crankarm 26 is formed with a screw hole 26B coaxially communicating with the spline hole 26A and having an inner diameter larger than that of the spline hole 26A. The screw hole 24B threadably engages a crankarm mounting screw 27 provided with a flange portion that abuts against the annular shoulder surface defined between the spline hole 26A and the screw hole 24B. As a result, the crankarm 26 is prevented from being dislodged from the crankshaft 24.

The connection between the crankshaft 24 and the crankarm 28 on the other side is performed in the same manner as the above discussed connection between the crankshaft 24 and the crankarm 26.

A pedal 30 is attached to the free end of each crankarm 26, 28. A drive sprocket 32 (chain wheel) is positioned between the crankarm 28 on the right side and the bearing tube 20. The drive sprocket 32 is coaxially connected (fixed) to the crankshaft 24.

The crankshaft 24 can be rotationally driven by the left and right crankarms 26 and 28. The rotation of the crankshaft 24 is transmitted to the drive sprocket 32, and is transmitted from the drive sprocket 32 to the rear wheel (not shown in the drawings) by a chain transmission mechanism (not shown in the drawings). As a result, the electric power assisted bicycle 10 travels forward.

The electric power assisted bicycle 10 is provided with a unitized and retrofittable electric power assist device 50. In the following description, The various directions such as up/down, front/back, and right/left are based on the state where the electric power assist device 50 is attached to the frame structure 18 of the electric power assisted bicycle 10 as shown in FIG. 1.

The electric power assist device 50 is provided with a housing 52 having a hollow structure. The housing 52 includes a ring portion 54 and a tongue shaped extension portion 56 extending radially outward from the ring portion 54. An electric motor 58 for generating an assist force is attached to the right surface of the extension portion 56. One end of the electric motor 58 is fixed to the extension portion 56 so that the rotational axis of the rotor output shaft (not shown in the drawings) is directed in the lateral direction.

As shown in FIG. 2, the ring portion 54 includes a cylindrical portion 62 centrally defining a central opening 60 that is open in the lateral direction, The cylindrical portion 62 rotatably supports an annular rotational output member 64 on the outer periphery thereof. The cylindrical portion 62 is disposed between the frame structure 18 and the crankarm 26 in a coaxial relationship to the crankshaft 24 together with the rotational output member 64 while the crankshaft 24 extends laterally through the central opening 60 in a loosely received state. The rotational output member 64 is connected to the electric motor 58 in a torque transmitting relationship via a gear train (not shown in the drawings) provided in the housing 52, and is thereby rotationally driven by the electric motor 58 in a coaxial relationship to the crankshaft 24.

The cylindrical portion 62 and the rotational output member 64 are installed between the frame structure 18 and the crankarm 26 by the following procedure. First, the left pedal 30 which is on the side not fitted with the drive sprocket 32 is removed by using a common tool such as a spanner. Next, with the electric power assist device 50 tilted sideways (the posture in which the electric motor 58 faces upward), the free end side of the left crankarm 26 is inserted into the central opening 60, and with the crankarm 26 passed into the central opening 60, the electric power assist device 50 is moved toward the base end side (rotational center side) of the crankarm 26 along the extending direction of the crankarm 26.

As a result, the crankarm 26 is passed through the cylindrical portion 62 and the rotational output member 64 until the cylindrical portion 62 and the rotational output member 64 are positioned near the base end of the crankarm 26. The inner diameter of the central opening 60 is dimensioned so that the crankarm 26 may be passed through the central opening 60. If the central opening 60 has a large enough inner diameter to allow the pedal 30 attached to the crankarm 26 to be pass through, the assembly work can be performed without requiring the pedal 30 to be removed.

Next, the electric power assist device 50 is oriented to the normal posture (the posture shown in FIG. 1) in which the electric motor 58 faces sideways, and the crankshaft 24 is loosely passed into the central opening 60 in the axial direction. As a result, the cylindrical portion 62 and the rotational output member 64 can be positioned between the frame structure 18 and the crankarm 26 with the crankshaft 24 extending laterally and loosely received in the central opening 60 simply by removing the pedal 30 or without even requiring the pedal 30 to be removed.

The rotational output member 64 is connected to the crankshaft 24 and the crankarm 26 by a connecting mechanism 70. The connecting mechanism 70 includes a connecting main member 72 and two wedge members (clamp piece members) 74 and 77.

The screw hole 26B of the crankarm 26 threadably receives a male screw portion 78A of a flanged screw member 78 constituting a mount part for the crankarm 26 of the connecting main member 72. The connecting main member 72 has a substantially circular disk shape having a trapezoidal cutout 73, and is fixed to the rotational output member 64 at the peripheral edge thereof by a plurality of bolts 75 and to the screw member 78 at the central part thereof by a bolt 76. As a result, the rotational output member 64 is coaxially positioned relative to the crankshaft 24 via the connecting main member 72 and the crankarm 26.

If there is a risk that the flange member 78B of the screw member 78 should interfere with the hub portion of the crankarm 26 (the base end portion of the crankarm 26 that defines the screw hole 26B), a collar member 79 (see FIG. 2) may be interposed between the tip of the male screw portion 78A and the bottom of the screw hole 26B.

The cutout 73 of the connecting main member 72 has a trapezoidal shape when viewed in the axial direction of the crankshaft 24, and the two lateral sides of the cutout 73 defines opposing surfaces 73A and 73B that are symmetric to each other and respectively oppose the front/rear surfaces 26C and 26D of the crankarm 26 with respect to the rotational direction of the crankarm 26. The opposing surfaces 73A and 73B extend radially from the outer peripheral edge of the connecting main member 72 toward the center of the connecting main member 72 at an oblique angle relative to the lengthwise direction of the crankarm 26. In other words, the opposing surfaces 73A and 73B are located on either side of the crankarm 26 with respect to the rotational direction thereof, and are inclined such that the distance between the opposing surfaces 73A and 73B progressively diminishes as one moves toward the center of the connecting main member 72.

The wedge members 74 and 77 are positioned symmetrically with each other in the cutout 73 on either side of the base end part of the crankarm 26 with respect to the rotational direction thereof.

One of the wedge members 74 is positioned in a triangular space defined between one of the front/rear surfaces 26C with respect to the rotational direction of the crankarm 26 and the corresponding opposing surface 73A of the connecting main member 72, and is provided with a sliding contact surface 74A that is in sliding contact with the corresponding front/rear surface 26C of the crankarm 26 and another sliding contact surface 74B that is in sliding contact with the other opposing surface 73A. The wedge member 74 is thus provided with a substantially triangular (wedge) shape as viewed in the axial direction of the crankshaft 24.

The other wedge member 77 is positioned in a triangular space defined between the other front/rear surface 26D with respect to the rotational direction of the crankarm 26 (opposite to the front/rear surfaces 26C) and the corresponding opposing surface 73B of the connecting main member 72, and is provided with a sliding contact surface 77A that is in sliding contact with the corresponding front/rear surface 26D of the crankarm 26 and another sliding contact surface 77B that is in sliding contact with the other opposing surface 73B on the opposite side of the sliding contact surface 77A. The wedge member 77 is thus provided with a substantially triangular (wedge) shape as viewed in the axial direction of the crankshaft 24.

The wedge members 74 and 77 are each formed with a bolt through hole 81 formed as a slot (a stadium shaped hole) elongated in the direction toward and away from the corresponding opposing surface 73A, 73B. Each bolt through hole 81 is a slot for inserting a bolt (screw member) 80, extending radially from a radially outer part of the corresponding wedge member 74, 77 to open at the corresponding sliding contact surface 74B, 77B opposing the corresponding opposing surface 73A, 73B, and elongated in parallel to a plane orthogonal to the lengthwise direction of the crankarm 26 and toward and away from the front/rear surfaces 26C and 26D of the crankarm 26. The connecting main member 72 is formed with a pair of screw holes 83 that open at the respective opposing surfaces 73A and 73B and threadably receive the corresponding bolts 80.

The bolts 80 provided for the respective wedge members 74 and 77 are passed through the corresponding bolt through holes 81 and threaded into the corresponding screw holes 83 to connect the respective wedge members 74 and 77 to the connecting main member 72 so that the wedge members 74 and 77 can be move toward and away from the connecting main member 72.

More specifically, as the bolts 80 are tightened, the corresponding wedge members 74 and 77 are caused to slide with respect to the corresponding opposing surfaces 73A and 73B toward the center of the connecting main member 72 and toward each other by being guided by the opposing surfaces 73A and 73B.

Owing to the displacement of the wedge members 74 and 77 toward each other, the sliding contact surfaces 74A and 77A are pressed against the corresponding front/rear surfaces 26C and 26D of the crankarm 26 under the wedge action. As a result, the front/rear surfaces 26C and 26D of the crankarm 26 and the sliding contact surfaces 74A and 77A of the wedge members 74 and 77 come into surface contact with each other, respectively. The wedge members 74 and 77 interpose the crankarm 26 from both sides with respect to the rotational direction so as to eliminate any rattling (gap) with the result that the crankarm 26 and the rotational output member 64 are securely connected to each other in a torque transmitting relationship. The assist force derived from the output of the electric motor 58 is thus transmitted from the rotational output member 64 to the crankshaft 24 via the connecting main member 72, the wedge members 74 and 77, and the crankarm 26.

The connecting mechanism 70 using the wedge members 74 and 77 allows the rattling between the wedge members 74 and 77 and the crankarm 26 and between the wedge members 74 and 77 and the connecting main member 72 to be eliminated by using a simple structure in an efficient manner simply by tightening the bolts 80 under the wedge action without regard to the size of the width of the base part of the crankarm 26 (the distance between the two front/rear surfaces 26C and 26D).

Thus, the rotational output member 64 can be connected to the crankshaft 24 in a coaxial and torque transmitting relationship without any rattling via the connecting mechanism 70 and the crankarm 26 simply by tightening the bolts 80 without regard to the width of the base part of the crankarm 26.

As a result, the flexibility in attaching the electric power assist device 50 to the bicycle 10 is improved, and the range of the types of bicycles to which the electric power assist device 50 can be attached is increased.

The extension portion 56 of the housing 52 is positioned under the down tube 14 with the electric motor 58 supported thereby, and is supported by the down tube 14 by being suspended therefrom via a support part 90.

The support part 90 includes a mount member 92. As shown in FIGS. 3 to 7, the mount member 92 includes a support base member 98 fixed to the down tube 14 by a fastening band 94 and provided with a rectangular frame structure part 96 in a lower part thereof, a rectangular plate-shaped part 100 fitted into the rectangular frame structure part 96 and fixed to the support base member 98, and a depending piece 102 depending downward from the rectangular plate-shaped part 100 and extending in the fore and aft direction.

Figure 6:
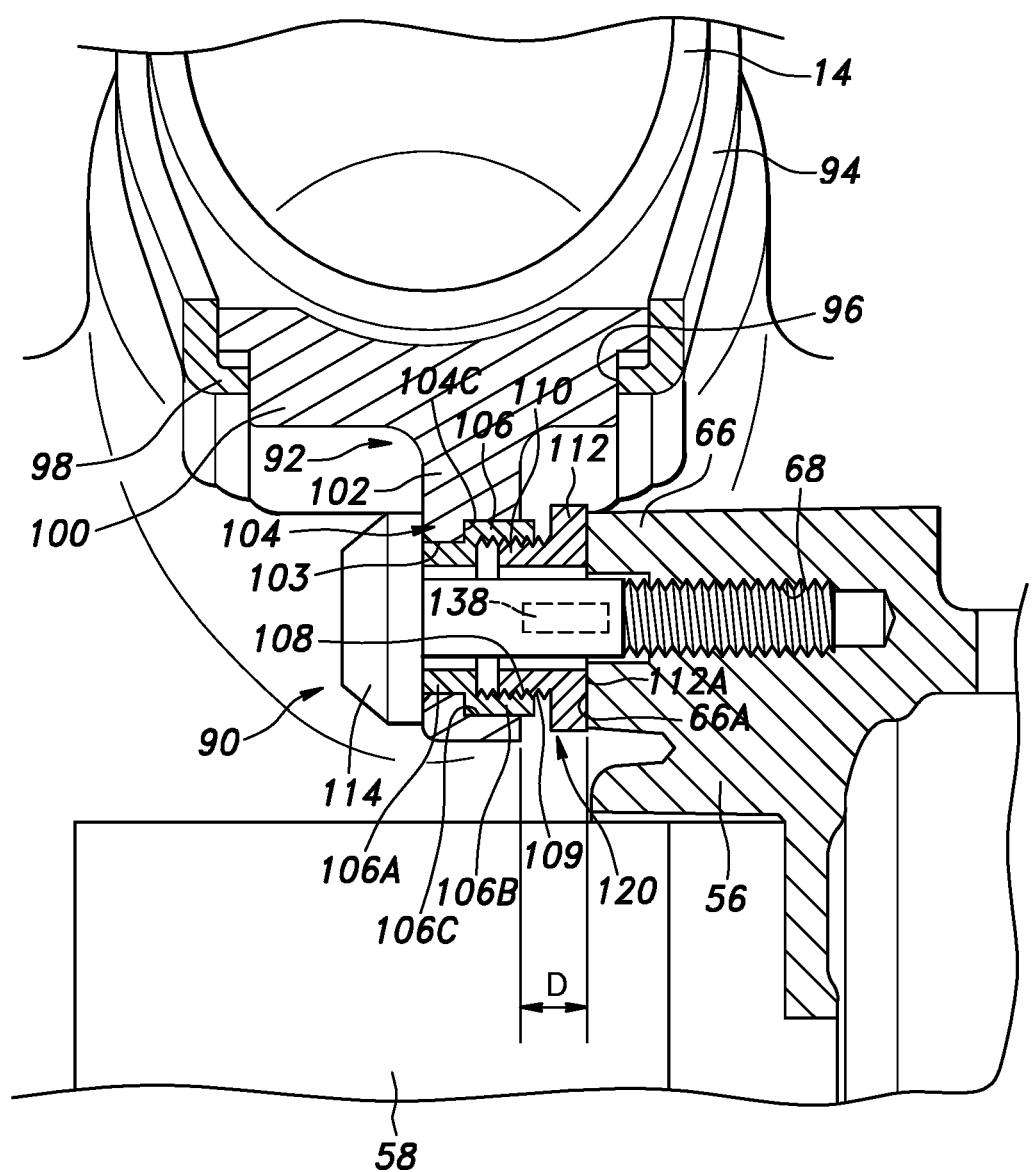
FIG. 6 is a fragmentary vertical sectional view of the bicycle.
Figure 7:
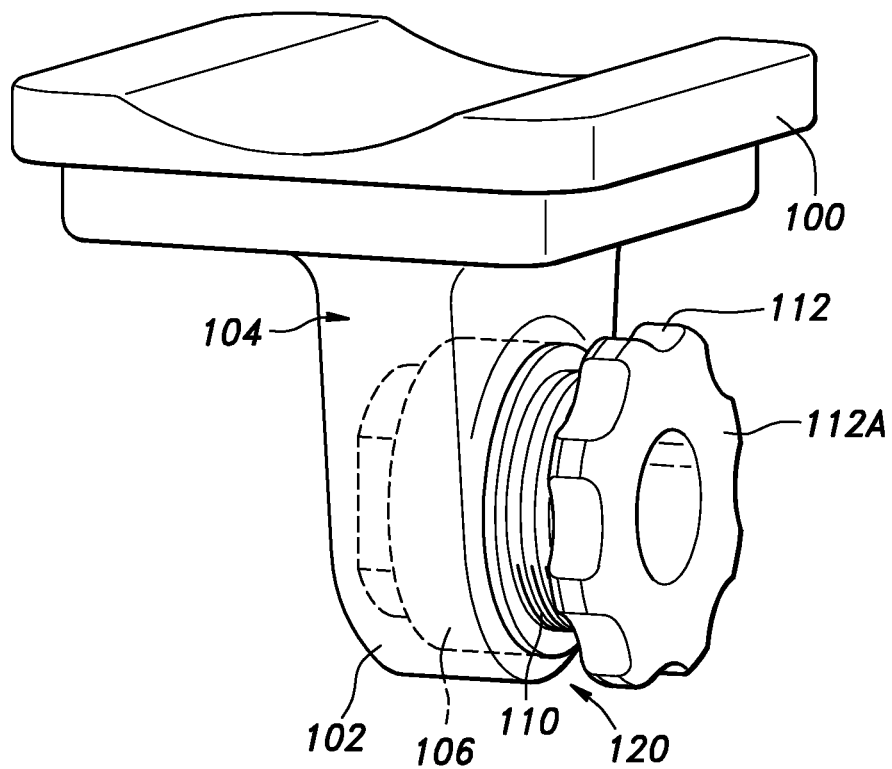
FIG. 7 is an enlarged perspective view of a housing support part provided with an adjustment mechanism for use in the electric power assist device.

The depending piece 102 is a cantilever piece, and is provided with a through hole 103 passed therethrough in the axial direction of the crankshaft 24 (or in the lateral direction) and provided with an annular shoulder 104C as shown in FIG. 6. A cylindrical fixed bush 106 is fitted in the through hole 103 of the depending piece 102 in a rotationally fast manner. The fixed bush 106 is provided with a small diameter portion 106A and a large diameter portion 106B, and an annular shoulder 106C defined between the small diameter portion 106A and the large diameter portion 106B abuts against the annular shoulder 104C of the through hole 103 to prevent the rightward movement of the fixed bush 106. The fixed bush 106 may also be fixed to the depending piece 102.

A female screw 108 is formed on the inner circumferential surface of the large diameter portion 106B. A male screw 109 formed on the outer circumferential surface of a movable bush 110 is threaded with the female screw 108 so that the movable bush 110 can be threaded into and out of the large diameter portion 106B in the axial direction of the crankshaft 24, or in the lateral direction.

The movable bush 110 is provided with a flange part 112 on the side remote from the fixed bush 106. The outer circumference of the flange part 112 is provided with an uneven shape similar to flower petals so that the movable bush 110 can be turned by hand. The laterally outwardly facing flange surface 112A of the flange part 112 is in direct contact with the laterally inwardly facing end surface 66A of a boss part (connecting part) 66 formed on an upper part of the extension portion 56 of the housing 52. The flange surface 112A and the end surface 66A are on a plane extending orthogonally to the central axis of the female screw 108 and the male screw 109.

The boss portion 66 is formed with a screw hole 68 opening at the end surface 66A thereof. The mount member 92 fixedly supports the housing 52 with a fastening bolt 114 (fastener) which is centrally passed through the fixed bush 106 and the movable bush 110 in the axial direction of the crankshaft 24 and threaded into (screw engaged with) the screw hole 68. The fastening bolt 114, the female screw 108, and the male screw 109 are disposed coaxially with one another.

Figure 4:
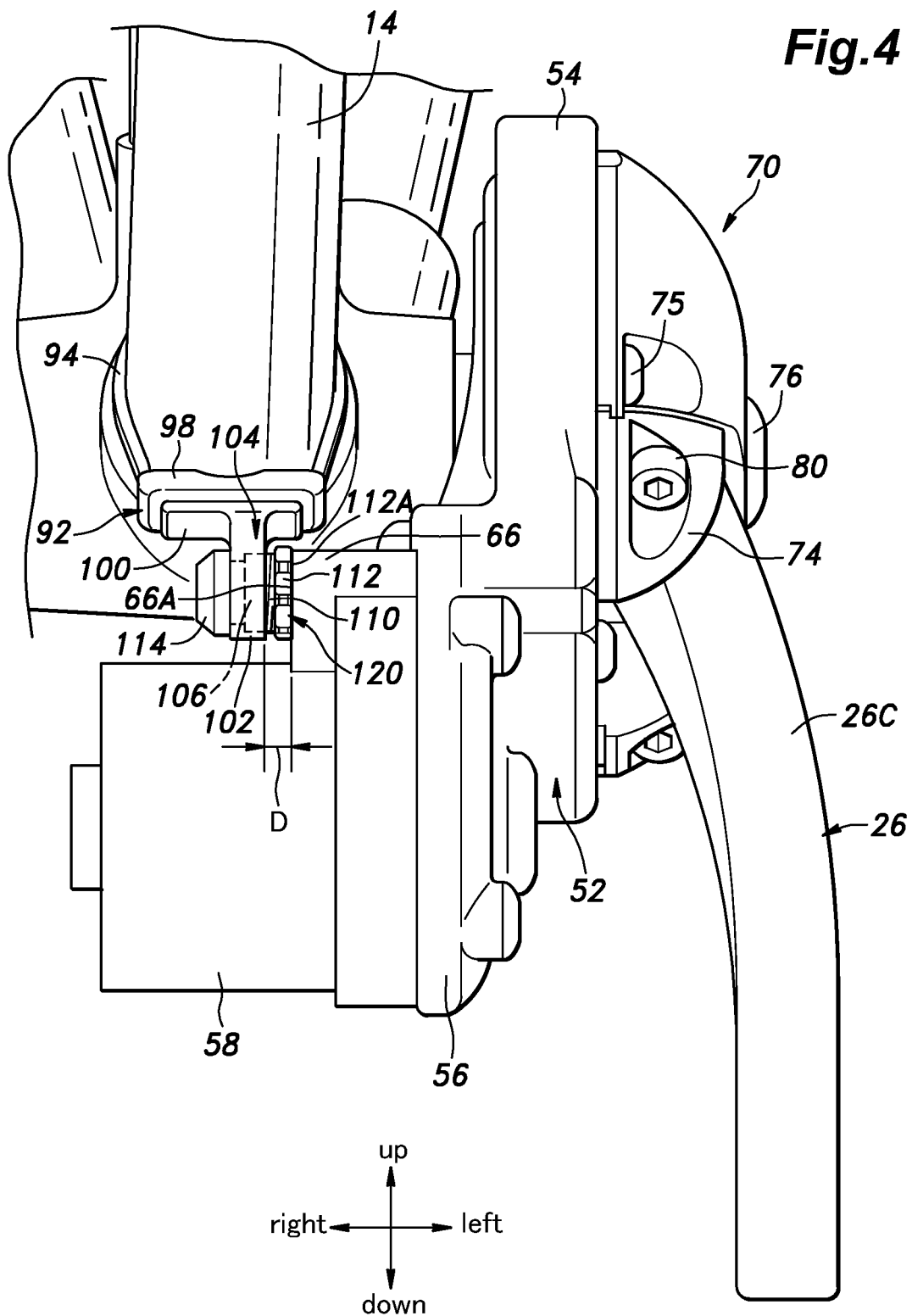
FIG. 4 is a fragmentary front view of the bicycle in a certain state.
Figure 5:
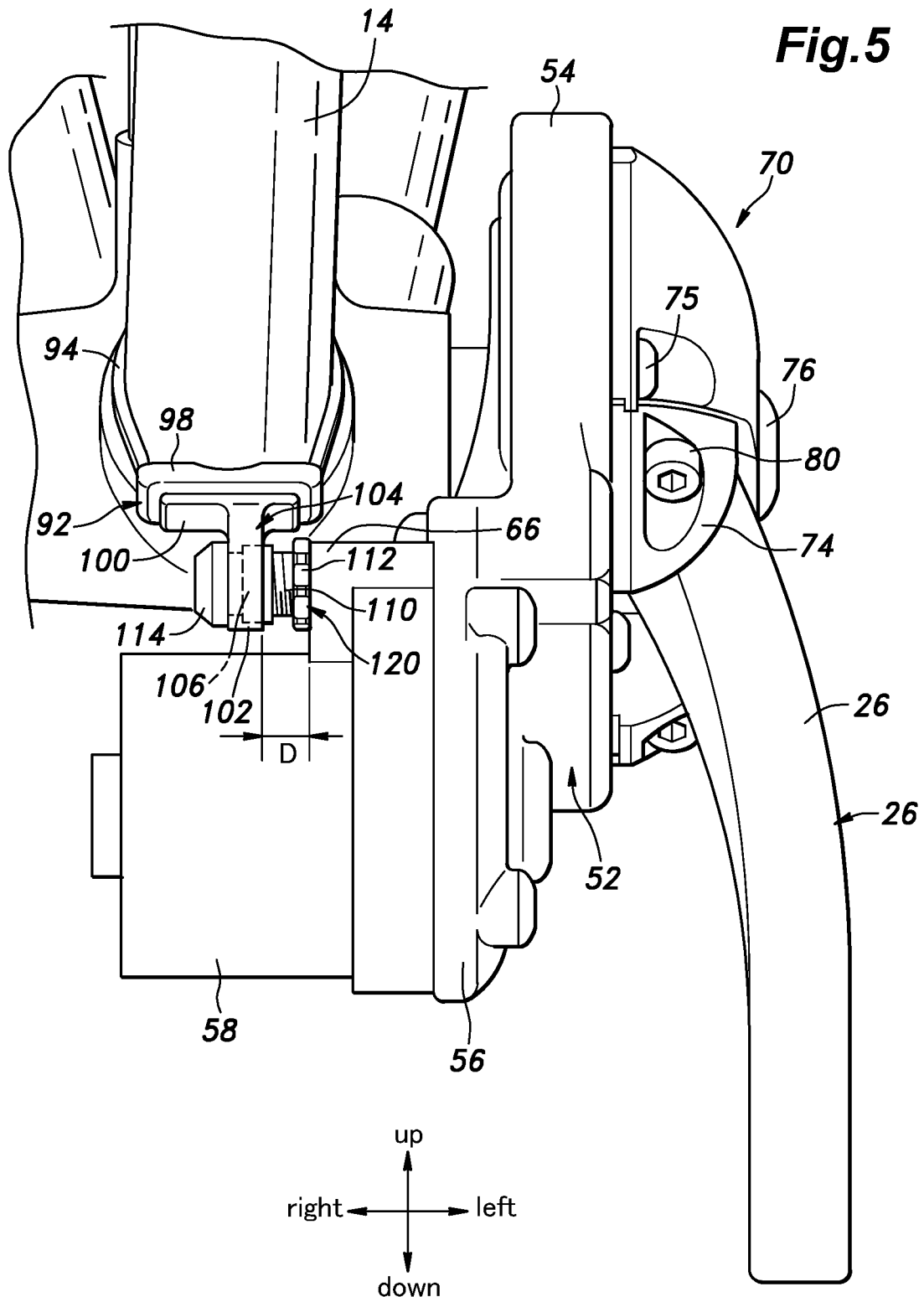
FIG. 5 is a fragmentary front view of the bicycle in another state.

In this way, the fixed bush 106 and the movable bush 110 are provided with a screw mechanism formed by the female screw 108 and the male screw 109 extending in the axial direction of the crankshaft 24 between the housing 52 and the frame structure 18, and as shown in FIGS. 4 and 5, the screw mechanism forms an adjustment mechanism 120 capable of adjusting (increasing or decreasing) the distance D between the mount member 92 and the housing 52 along the axial direction of the crankshaft 24.

The adjustment of the distance D by using the adjustment mechanism 120 is performed by loosening the screw engagement of the fastening bolt 114 with the screw hole 68, turning the movable bush 110 by the flange part 112 to thread the male screw 109 into and out of the female screw 108, and threading the fastening bolt 114 into the screw hole 68 to obtain an action of a lock nut.

By suitably adjusting the distance D, the tilting of the rotational output member 64 with respect to the central axis (crankshaft line) of the crankshaft 24 can be corrected, and the posture of the rotational output member 64 can be adjusted so that the rotational output member 64 extends along a plane orthogonal to the crankshaft axial line. Thus, the central axis of the rotational output member 64 can be adjusted to be parallel to the central axis of the crankshaft 24 by using the adjustment mechanism 120 which is simple in structure.

As a result, the rotation of the crankshaft 24 and the rotational output member 64 can be correctly transmitted to the crankshaft 24 without involving a runout component so that the frictional resistance and wear of the bearing parts or the like for the crankshaft 24 and the rotational output member 64 which can be otherwise caused by cyclic eccentric loading as a result of a runout can be reduced, Since the fastening bolt 114 and the adjustment mechanism 120 using a screw mechanism are provided coaxially with each other, a compact design is possible and the adjustment accuracy of the adjustment mechanism 120 can be improved.

As shown in FIG. 1, a control unit 130 for electric power assist and a battery 132 consisting of a secondary battery that serves as a power source for the electric motor 58 and the control unit 130 are attached to the seat tube 12 by using a fastening band (not shown in the drawings) or the like.

Figure 8:
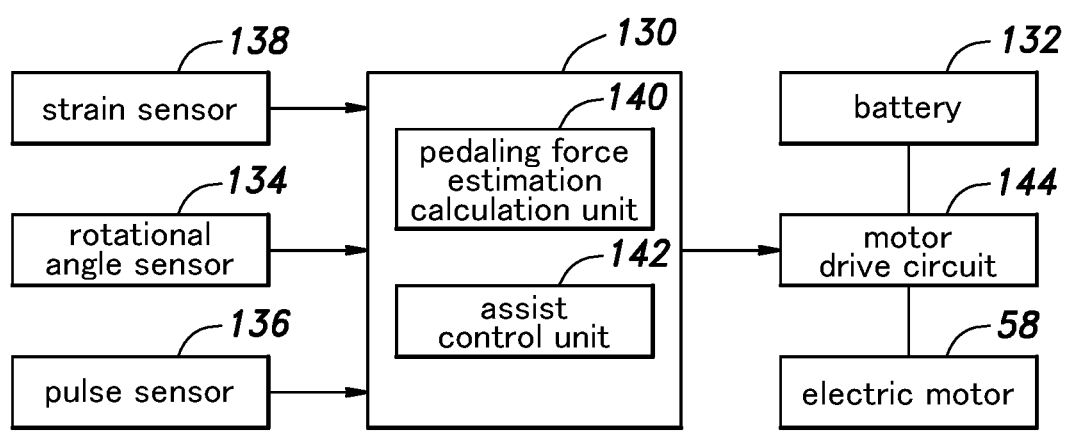
FIG. 8 is a block diagram of a control system of the electric power assist device.

Next, the control system of the electric power assist device 50 is described in the following with reference to FIG. 8.

A rotational angle sensor 134, a pulse sensor 136, and a strain sensor (stress sensor) 138 are connected to the control unit 130.

The rotational angle sensor 134 is composed of a Hall sensor or the like built into the electric motor 58, and determines the revolutions and angular position of the crankshaft 24 from the integrated value of the motor rotational angle and the reduction ratio of the transmission gear train (not shown in the drawings) provided in the housing 52. The rotational angle sensor 134 may also be composed of an absolute rotational encoder or the like that is not built into the electric motor 58 to detect the revolutions and the angular position of the crankshaft 24.

Figure 9:
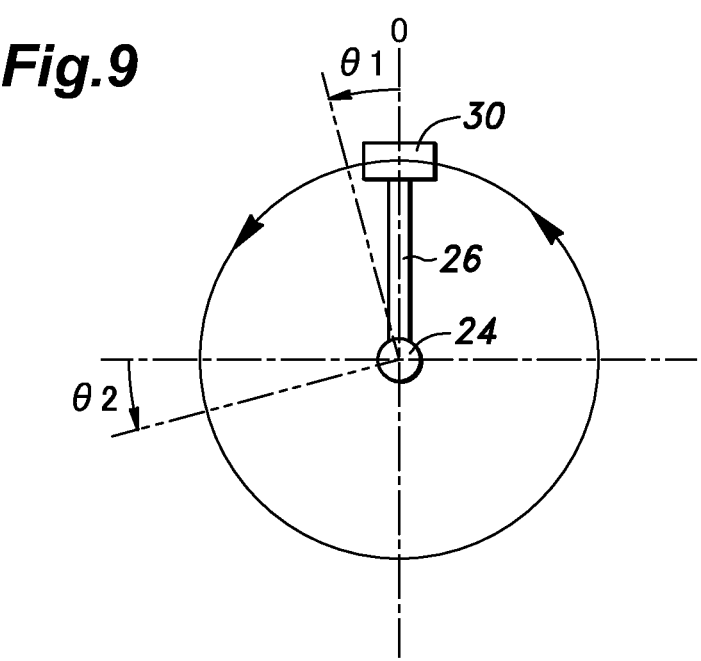
FIG. 9 is a diagram showing rotational crank angular positions of the bicycle.

The pulse sensor 136 is provided on the crankshaft 24 or the crankarm 26, and as shown in FIG. 9, serves as a rotation sensor that detects the reference point of the crank angle of the crankshaft 24 corresponding to the position at which the pedal 30 of one of the crankarms 26 is located at the topmost position, as well as the rotational movement of the crankshaft 24.

As shown in FIG. 6, the strain sensor 138 is provided on the fastening bolt 114 to serve as a measuring device for measuring the load of the support part 90 of the electric power assist device 50 acting on the frame structure 18 as a bending deformation amount (bending strain amount) of the fastening bolt 114. The strain sensor 138 may be provided either inside the fastening bolt 114 or on the surface of the fastening bolt 114.

The support part 90 is subjected to a force (load) that opposes the rotational of the electric power assist device 50 about the crankshaft 24 relative to the frame structure 18 under the rotational output of the electric motor 58 and the pedaling (pedaling force) of the pedal 30, and this force is applied to the fastening bolt 114 as a bending load (shear load). As a result, the fastening bolt 114 undergoes a bending deformation in response to the rotational torque of the electric motor 58 and the pedaling force.

As a result, the strain sensor 138 is able to quantitatively measure the amount of bending deformation of the fastening bolt 114 due to the rotational torque of the electric motor 58 and the pedaling force.

The control unit 130 is an electronically controlled device including a microcomputer and the like, and has a pedaling force estimation calculation unit 140 and an assist control unit 142.

The pedaling force estimation calculation unit 140 receives information on the crank rotational angular position from the rotational angle sensor 134, information on the reference point of the crank angle of the crankshaft 24 and the rotational movement of the crankshaft 24 from the pulse sensor 136, and information on the strain from the strain sensor 138, and estimates the pedaling force of the electric power assisted bicycle 10 from the difference between the strain at a first crank rotational angular position and the strain at a second crank rotational angular position different from the first crank rotational angular position. The pedaling force estimation calculation unit 140 estimates the pedaling force to be greater with an increasing difference between the strain at the first crank rotational angular position and the strain at the second crank rotational angular position.

The first crank rotational angular position may comprise an angular range that may range from the uppermost position of the pedal 30 of the crankarm 26 to an angular position of 90 degrees or less, and the second crank rotational angular position may comprise an angular range that may range from the uppermost position of the pedal 30 of the crankarm 26 to an angular position of from 90 degrees to 180 degrees.

The first crank rotational angular position and the second crank rotational angular position may each consist of at least one angular point within the corresponding angular range mentioned above. Alternatively, as shown in FIG. 9, the first crank rotational angular position may be given as an average value or an integrated value of the strain in a first angular range $\theta 1$ ranging from the uppermost position of the pedal 30 to an angular position which is advanced by 15 degrees therefrom, and the second crank rotational angular position may be an average value or an integrated value of the strain in a second angular range $\theta 2$ ranging from an angular position which is advanced by 90 degrees to an angular position which is further advanced by about 15 degrees therefrom. The average value or the integrated value of the strain in the first angular range $\theta 1$ is greater in value than the average value or the integrated value of the strain in the second angular range θ2, and this difference is substantially in proportion to the pedaling force.

The assist control unit 142 outputs a control command to the motor drive circuit 144 so as to operate the electric motor 58 with a drive current corresponding to the pedaling force estimated by the pedaling force estimation calculation unit 140, or so as to control the assist amount.

The motor drive circuit 144 quantitatively sets the drive current to be supplied from the battery 132 to the electric motor 58. As a result, the electric motor 58 assists the pedaling with the rotational output thereof or the assist amount corresponding to the estimated value of the pedaling force.

Since the sensor for estimating the pedaling force for the power assist control consists of the strain sensor 138 provided on the fastening bolt 114 for the support part 90 that supports the electric power assist device 50 on the frame structure 18 of the bicycle 10, or in other words, the fastening bolt 114 that is located externally of the frame structure 18, the sensor for the power assist control can be easily installed without requiring modification of the bicycle 10.

Figure 10:
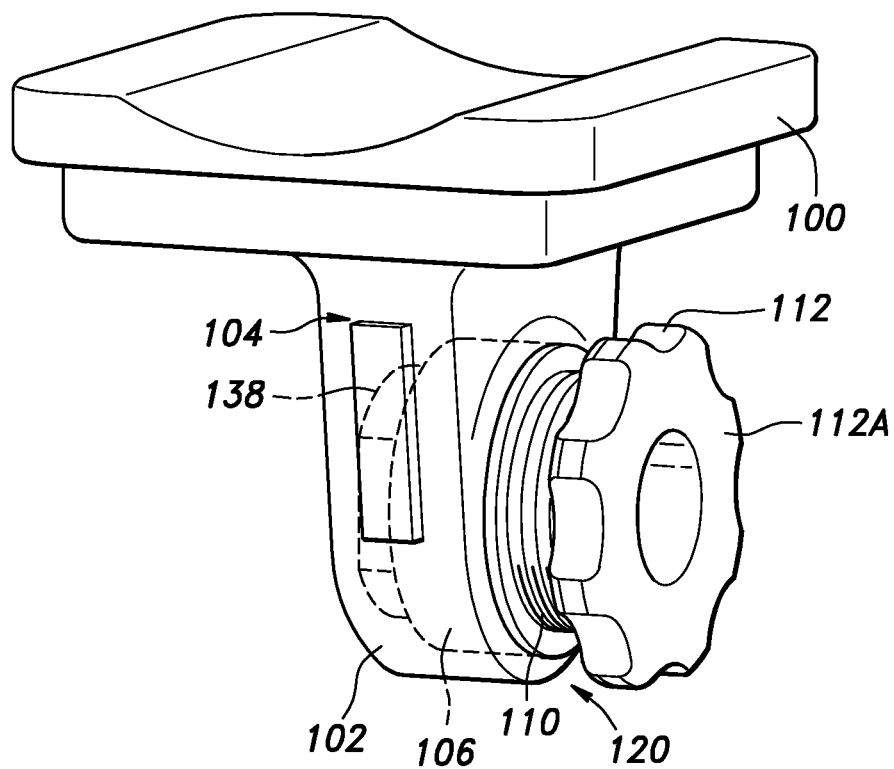
FIG. 10 is a fragmentary enlarged perspective view of the housing support part of the electric power assist device.

In another embodiment, the strain sensor 138 is provided on the surface of the depending piece 102 of the mount member 92 as shown in FIG. 10. In this embodiment, the strain sensor 138 measures the amount of compression/elongation deformation (compression/elongation strain amount) of the depending piece 102 due to the rotational torque of the electric motor 58 and the pedaling force.

In this embodiment also, since the sensor for estimating the pedaling force for the power assist control consists of the strain sensor 138 provided on the mount member 92 for the support part 90 that supports the electric power assist device 50 on the frame structure 18 of the bicycle 10, or in other words, on the mount member 92 that is located externally of the frame structure 18, the sensor for the power assist control can be easily installed without requiring modification of the bicycle.

Figure 11:
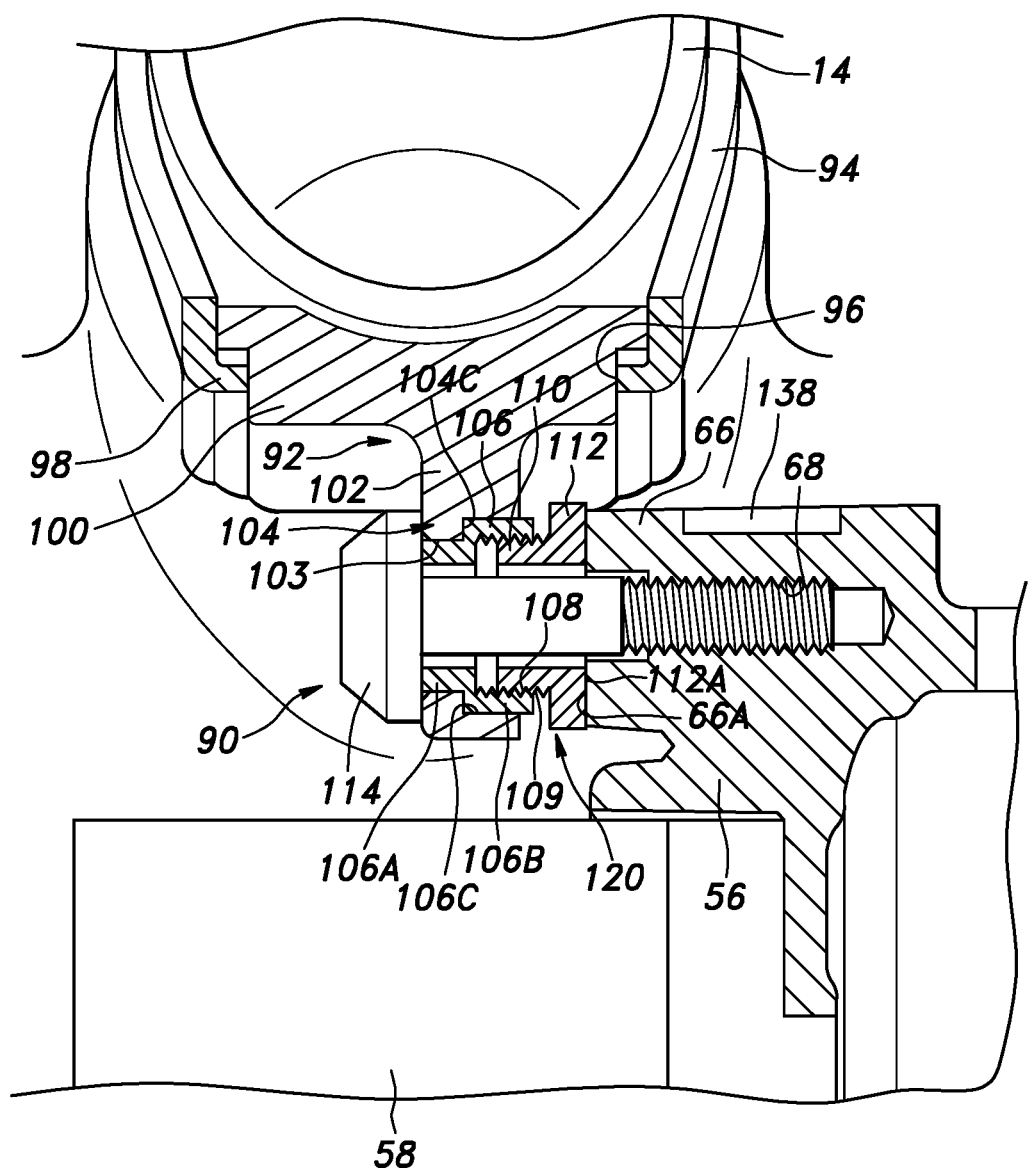
FIG. 11 is a fragmentary vertical sectional view of a bicycle fitted with an electric power assist device according to another embodiment of the present invention.

In yet another embodiment, the strain sensor 138 is provided on the surface of the boss portion 66 of the support part 90 for supporting the electric power assist device 50 on the frame structure 18 of the bicycle 10 from the side of the electric power assist device 50 as shown in FIG. 11. In this embodiment, the strain sensor 138 measures the amount of bending deformation (the amount of bending strain) of the boss portion 66 due to the rotational torque of the electric motor 58 and the pedaling force.

In this embodiment also, since the sensor for estimating the pedaling force for the power assist control consists of the strain sensor 138 provided on the boss portion 66 of the support part 90 for supporting the electric power assist device 50 on the frame structure 18 of the bicycle 10 from the side of the electric power assist device 50, or in other words, on the boss portion 66 that is located externally of the frame structure 18, the sensor for the power assist control can be easily installed without requiring modification of the bicycle.

Figure 12:
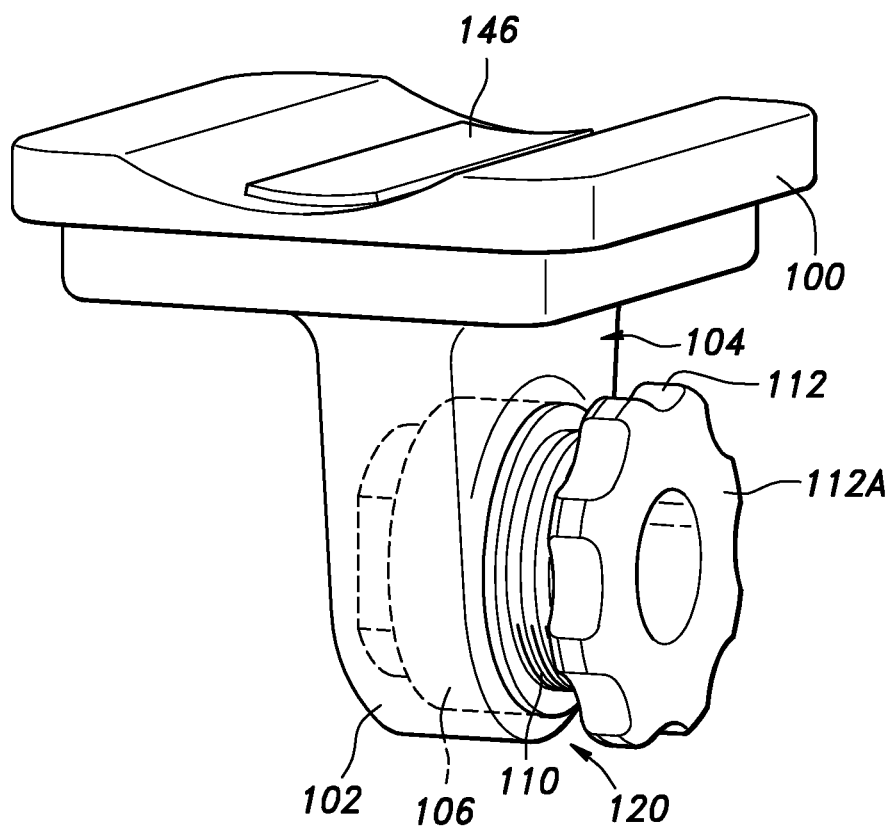
FIG. 12 is a fragmentary enlarged perspective view of the housing support part of an electric power assist device according to yet another embodiment of the present invention.

In yet another embodiment, as shown in FIG. 12, a load sensor (pressure sensor) 146 is provided so as to be interposed between the surfaces of the down tube 14 and the rectangular plate-shaped part 100 of the mount member 92. The load sensor 146 measures the compressive load (stress) generated between the frame structure 18 and the electric power assist device 50 due to the rotational torque of the electric motor 58 and the pedaling force.

Figure 13:
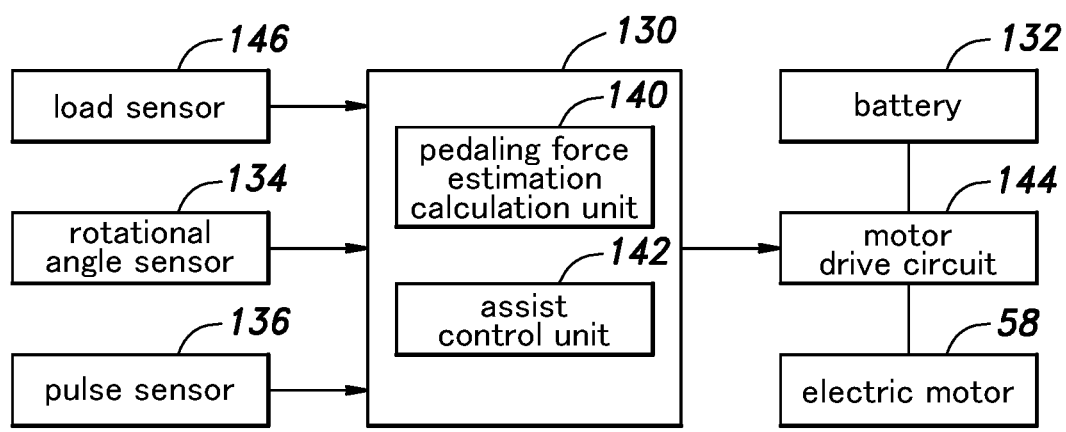
FIG. 13 is a block diagram of a control system of an electric power assist device according to yet another embodiment of the present invention.

In this embodiment, as shown in FIG. 13, the pedaling force estimation calculation unit 140 of the control unit 130 receives information on the crank rotational angular position from the rotational angle sensor 134, information on the reference point of the crank angle of the crankshaft 24 and the rotational movement of the crankshaft 24 from the pulse sensor 136, and information on the load from the load sensor 146, and estimates the pedaling force of the electric power assisted bicycle from the difference between the load at a first crank rotational angular position and a second crank rotational angular position different from the first crank rotational angular position. The pedaling force estimation calculation unit 140 estimates the pedaling force to be greater with an increasing difference between the load at the first crank rotational angular position and the load at the second crank rotational angular position.

In this embodiment also, since the sensor for estimating the pedaling force for the power assist control consists of the load sensor 146 provided in a part of the support part 90 for supporting the electric power assist device 50 on the frame structure 18 of the bicycle 10 that is located between the frame structure 18 and the electric power assist device 50, or in other words, the load sensor 146 that is located externally of the frame structure 18, the sensor for the power assist control can be easily installed without requiring modification of the bicycle.

Figure 14:
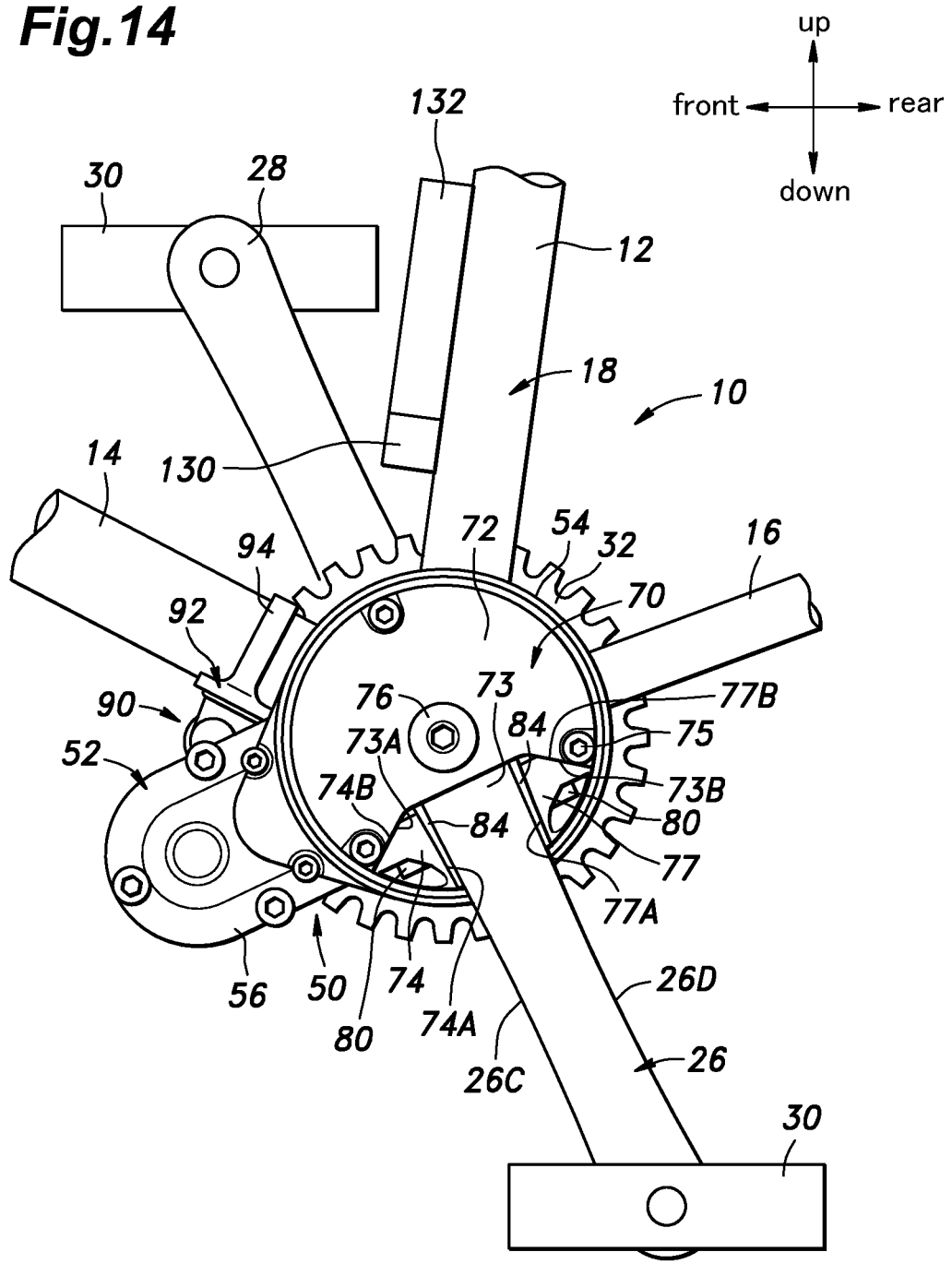
FIG. 14 is a fragmentary side view of a bicycle fitted with an electric power assist device according to yet another embodiment of the present invention.

An electric power assist device and a bicycle according to yet another embodiment of the present invention are described in the following with reference to FIG. 14. In FIG. 14, the parts corresponding to those in FIGS. 1 and 2 are denoted with like numerals without necessarily repeating the description of such parts.

In this embodiment, a plate-shaped elastic member 84 made of rubber or the like is interposed between one of the front/rear surfaces 26C of the crankarm 26 and the corresponding sliding contact surface 74A of the wedge member 74 opposing this front/rear surface 26C, and a plate-shaped elastic member 84 made of rubber or the like is similarly interposed between the other front/rear surface 26D of the crankarm 26 and the corresponding wedge member 77 opposing this front/rear surface 26D.

According to this embodiment, even when the front/rear surfaces 26C and 26D of the crankarm 26 and the sliding contact surfaces 74A and 77A of the wedge members 74 and 77 are not highly parallel to each other, or involve some unevenness, the front/rear surfaces 26C and 26D of the crankarm 26 and the sliding contact surfaces 74A and 77A of the wedge members 74 and 77 can be brought into surface contact with each other indirectly owing to the elastic deformation of the elastic members 84.

As a result, even if the parallelism between the front/rear surfaces 26C and 26D of the crankarm 26 and the sliding contact surfaces 74A and 77A of the wedge members 74 and 77 is poor or may differ in shape from each other, torque can be transmitted between the wedge members 74 and 77 and the crankarm 26 without involving any rattling and in a reliable manner. Therefore, the range of types of bicycles to which the electric power assist device 50 can be attached can be further expanded.

The present invention has been described in terms of specific embodiments, but is not limited by such embodiments, and can be modified in various ways without departing from the scope of the present invention. For example, it may be arranged such that the wedge member 77 is integrally provided with the connecting main member 72, and only the wedge member 74 is formed as a movable member that acts as a wedge. It may also be arranged such that the housing 52 is positioned between the seat tube 12 and the down tube 14, and the housing is supported by the frame structure 18 at the seat tube 12 or the down tube 14 thereof.

In addition, all of the components shown in the above-described embodiments are not necessarily essential for the present invention, but can be appropriately omitted and substituted as long as such omission and substitution do not deviate from the gist of the present invention.

LIST OF REFERENCE NUMERALS

| | |
|---|---|
| 10: bicycle | 12: seat tube |
| 14: down tube | 16: chain stay |
| 18: frame structure | 20: bearing tube |
| 24: crankshaft | 24A: spline shaft part |
| 24B: screw hole | 26: crankarm |
| 26A: spline hole | 26B: screw hole |
| 26C: front and rear surface | 26d: front and rear surface |
| 27: crankarm mounting screw | 28: crankarm |
| 30: pedal | 32: drive sprocket |
| 50: electric power assist device | 52: housing |
| 54: ring part | 56: extension portion |
| 58: electric motor | 60: central opening |
| 62: cylindrical part | 64: rotational output member |
| 66: boss part | 66A: end face |
| 68: screw hole | 70: connecting mechanism |
| 72: connecting main member | 73: cutout |
| 73A: opposing surface | 73B: opposing surface |
| 74: wedge member | 74A: sliding contact surface |
| 74B: sliding contact surface | 75: bolt |
| 76: bolt | 77: wedge member |
| 77A: sliding contact surface | 77B: sliding contact surface |
| 78: screw member | 78A: male thread part |
| 78B: flange member | 79: collar member |
| 80: bolt (screw member) | 81: bolt through hole (slot) |
| 83: screw hole | 84: elastic member |
| 90: support part | 92: mount member |
| 94: fastening band | 96: rectangular frame structure part |
| 98: support base member | 100: rectangular plate-shaped part |
| 102: depending piece | 103: through hole |
| 104: support member | 104C: shoulder part |
| 106: fixed bush | 106A: small diameter part |
| 106B: large diameter part | 106C: shoulder |
| 108: female screw | 109: male screw |
| 110: movable bush | 112: flange part |
| 112A: flange surface | 114: fastening bolt (fastener) |
| 120: adjustment mechanism | 130: control unit |
| 132: battery | 134: rotational angle sensor |
| 136: pulse sensor | 138: distortion sensor |
| 140: pedaling force estimation calculation unit (pedaling force estimation unit) | |
| 142: assist control unit | 144: motor drive circuit |
| 146: load sensor | |

The invention claimed is:

1. An electric power assist device configured to be attached to a frame structure of a bicycle, comprising:
a housing;
an electric motor supported by the housing; and
an annular rotational output member configured to be connected to a crankshaft for a pedal of the bicycle or a crankarm attached to the crankshaft so as to be rotatively driven by the electric motor coaxially with respect to the crankshaft,
wherein the housing is supported on the frame structure via a support part provided with an adjustment mechanism to allow a position of the housing along an axial direction of the crankshaft to be varied,
the electric power assist device further comprising a connecting structure configured to connect the rotational output member to the crankarm of the bicycle in a torque transmitting relationship,
wherein the connecting structure comprises
a connecting main member having an opposing surface configured to oppose one of front or rear surfaces of the crankarm of the bicycle with respect to a rotational direction thereof and fixed to the rotational output member,
a wedge member configured to be interposed between the one of the front or rear surfaces of the crankarm and the opposing surface of the connecting main member, and
a screw member configured to move the wedge member toward and away from the connecting main member.

2. The electric power assist device according to claim 1, wherein the adjustment mechanism includes a screw mechanism extending in a direction parallel to the axial direction of the crankshaft between the housing and the frame structure.

3. The electric power assist device according to claim 2, wherein the support part includes a mount member fixed to the frame structure and provided with a through hole extending in the axial direction, a screw hole formed in the housing, and a fastening bolt passed through the through hole and threaded into the screw hole, and the screw mechanism is configured to adjust a distance between the mount member and the housing along the axial direction.

4. The electric power assist device according to claim 3, wherein the fastening bolt and the screw mechanism are provided coaxially with each other.

5. The electric power assist device according to claim 1, wherein the wedge member is provided with a pair of sliding contact surfaces slidably contacting the one of the front or rear surfaces and the opposing surface, respectively, and a slot that is passed through the wedge member substantially parallel to a lengthwise direction of the crankarm from a radially outer side thereof with respect to the crankshaft to the sliding contact surface corresponding to the opposing surface so as to define an opening at the sliding contact surface, and to receive the screw member therein, the slot being elongated in a direction parallel to a plane orthogonal to the lengthwise direction of the crankarm and extending toward and away from the one of the front or rear surfaces,
the connecting main member being provided with a screw hole opening at the opposing surface and threadably receiving the screw member therein.

6. The electric power assist device according to claim 5, further comprising an elastic member interposed between the one of the front or rear surfaces of the crankarm and the sliding contact surface of the wedge member opposing the one of the front or rear surfaces.

7. The electric power assist device according to claim 1, wherein the opposing surface of the connecting main member extends along a radial direction of the connecting main member at an oblique angle to a lengthwise direction of the crankarm, and the wedge member is substantially triangular in shape when viewed in the axial direction of the crankshaft.

8. The electric power assist device according to claim 1, wherein the connecting main member further has an other opposing surface configured to oppose an other of the front or rear surfaces of the crankarm, and the connecting structure comprises an additional wedge member configured to be interposed between the other of the front or rear surfaces of the crankarm and the other opposing surface of the connecting main member.

9. A bicycle fitted with the electric power assist device according to claim 1.

* * * * *